(12) United States Patent
Wolfram et al.

(10) Patent No.: US 8,874,357 B2
(45) Date of Patent: Oct. 28, 2014

(54) DETERMINATION OF THE CENTER OF GRAVITY

(71) Applicant: Deutsches Zentrum fuer Luft- und Raumfahrt e.V., Cologne (DE)

(72) Inventors: Jens Wolfram, Meine (DE); Steffen Greiser, Braunschweig (DE); Susanne Seher-Weiss, Stuttgart (DE)

(73) Assignee: Deutsches Zentrum für Luft- und Raumfahrt e.V., Cologne (DE)

( * ) Notice: Subject to any disclaimer, the term of this patent is extended or adjusted under 35 U.S.C. 154(b) by 297 days.

(21) Appl. No.: 13/723,419

(22) Filed: Dec. 21, 2012

(65) Prior Publication Data

US 2013/0197792 A1    Aug. 1, 2013

(30) Foreign Application Priority Data

Dec. 21, 2011   (DE) .......................... 10 2011 056 777

(51) Int. Cl.
| | |
|---|---|
| *G06F 17/10* | (2006.01) |
| *G06G 7/48* | (2006.01) |
| *G01C 23/00* | (2006.01) |
| *G01M 1/12* | (2006.01) |

(52) U.S. Cl.
CPC ............... *G01C 23/00* (2013.01); *G01M 1/125* (2013.01)
USPC ...................... 701/124; 701/1; 701/3; 701/14

(58) Field of Classification Search
USPC ............................................ 701/1, 3, 14, 124
See application file for complete search history.

(56) References Cited

U.S. PATENT DOCUMENTS

| | | | | |
|---|---|---|---|---|
| 4,937,754 | A | * | 6/1990 | Buisson et al. ............... 701/124 |
| 4,949,269 | A | * | 8/1990 | Buisson et al. ............... 701/124 |
| 5,571,953 | A | * | 11/1996 | Wu .............................. 73/65.06 |
| 6,126,111 | A | * | 10/2000 | Burcham et al. ............ 244/76 R |
| 8,260,477 | B2 | * | 9/2012 | Almalki et al. .................... 701/3 |
| 2005/0051666 | A1 | * | 3/2005 | Lee et al. ......................... 244/10 |
| 2009/0143926 | A1 | * | 6/2009 | Almalki et al. .................... 701/3 |

* cited by examiner

*Primary Examiner* — Bravesh V Amin
(74) *Attorney, Agent, or Firm* — Whitham Curtis Christofferson & Cook, PC

(57) ABSTRACT

A device for determining the actual center of gravity of a vehicle, having a control command input interface, a movement modeling unit, a sensor interface, and a computation unit. The control command input interface determines control command inputs for controlling the movement of the vehicle. The movement modeling unit calculates reference acceleration data at a model reference point of the vehicle on the basis of movements of the vehicle, which are derived from a vehicle movement model, with respect to the control command inputs. The sensor interface determines sensor acceleration data which are measured at a sensor reference point of the vehicle and relate to the vehicle's actual movements resulting from the command inputs. The computation unit determines the actual center of gravity of the vehicle on the basis of an assumed center of gravity and the difference between the reference acceleration data and the sensor acceleration data.

10 Claims, 3 Drawing Sheets

DETERMINATION OF THE CENTER OF GRAVITY

Figure 1:
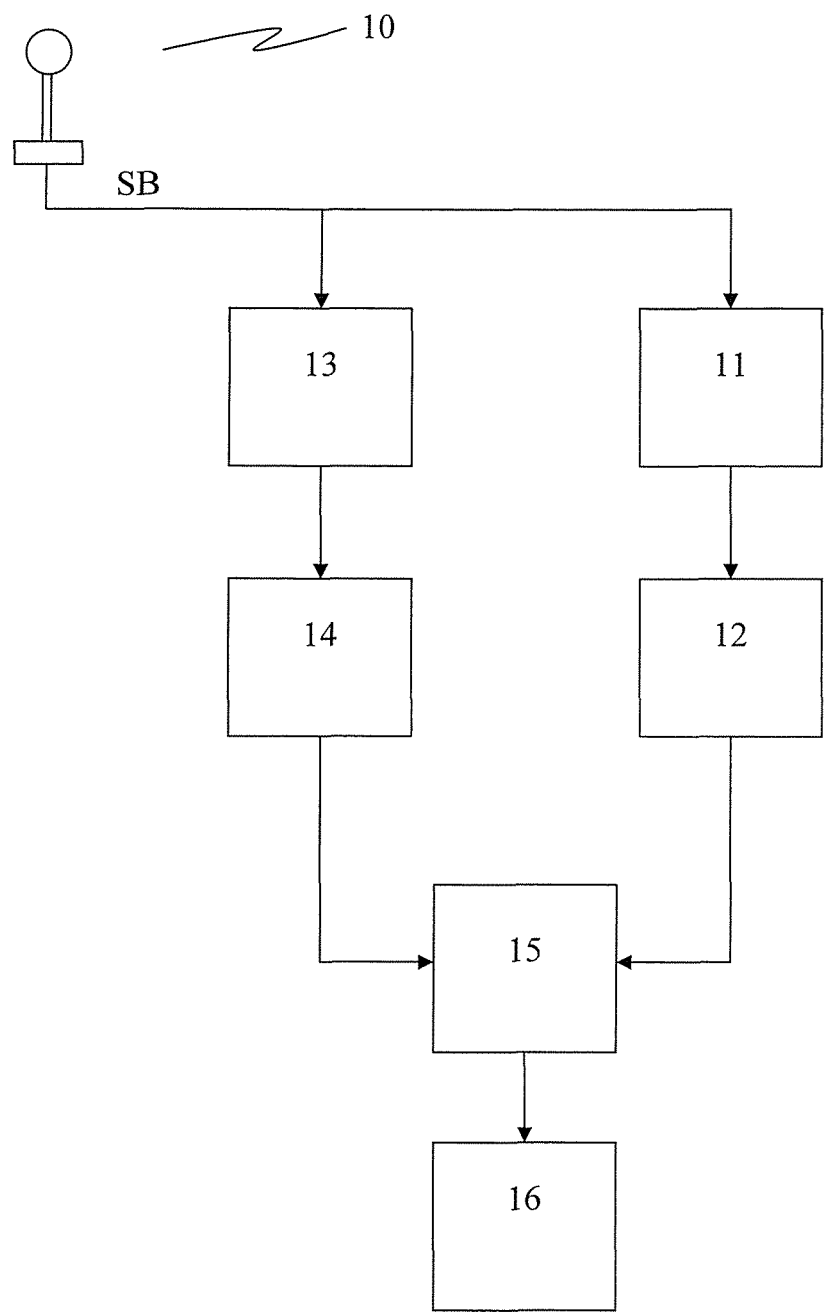

The invention relates to a device and a method for determining the actual center of gravity of a vehicle.

The actual center of gravity of an aircraft depends on a multiplicity of flight-dependent, operation-dependent and mission-dependent parameters. Such parameters may be, for example, the type of loads to be transported, the distribution of the loads in the aircraft, the loading state, the number of passengers or the amount of fuel being carried, to list but a few examples. Even during a flight, the actual center of gravity of the aircraft may shift considerably from the theoretically assumed position of the center of gravity, for example because the amount of fuel on board changes as a result of the consumption of the fuel, which may have a direct effect on the position of the actual center of gravity.

The position of the actual center of gravity is of great interest to the pilot, in particular in the case of high-performance aircraft, for example fighter aircraft or helicopters, because a changed position of the center of gravity can change the flight behavior, which must be taken into account during control and/or by the pilot. However, even in the case of transport aircraft in which it is necessary to precisely handle the flying object, knowledge of the actual center of gravity is important for precisely controlling the flying object. This also applies to load-carrying helicopters, for example.

If a movement and/or acceleration sensor system is installed at the theoretically assumed center of gravity of the aircraft, it is possible to determine corresponding movement and/or acceleration data at the center of gravity of the aircraft. These movement and/or acceleration data can be supplied, for example as input variables, to corresponding instruments or automatic control systems which carry out automated control, inter alia on the basis of these movement and/or acceleration data at the center of gravity of the aircraft, or stabilize the aircraft in particular flying attitudes by driving corresponding actuators.

Since the sensor system for acquiring the movement and/or acceleration data is generally permanently arranged in the aircraft at the theoretically assumed center of gravity (or its outputs are converted to the latter), a deviation of the actual center of gravity from the theoretically assumed center of gravity results in the sensor system measuring additional movement and/or acceleration components which would not occur if the sensor system were arranged at the actual center of gravity of the aircraft. These errors can be observed, in particular, in the case of intense rolling and pitching movements, in particular in aircraft having high agility.

In the case of an abrupt rolling input on the flying object, such a deviation from the theoretically assumed center of gravity may result, for example, in the measured accelerations having a reversed sign, which could not be expected during measurement at the actual center of gravity. When using this acceleration as an input variable for digital instruments or control systems, this may then result in errors which could be disruptive or even critical during flight. For example, the use of such erroneous acceleration data as an input variable for a digital turn-slip indicator results in an incorrectly directed display being shown, which may irritate the pilot. If such erroneous acceleration data are used as an input to control the aircraft, these errors resulting from the shift of the center of gravity may result in the manipulated variables of the aircraft attempting to minimize or even reverse this impression of acceleration, which may result in a jerky or unstable flight behavior.

U.S. Pat. No. 5,987,397 discloses a method for determining the total weight and the position of the center of gravity in helicopters, in which a non-linear correlation between a wide variety of operating parameters relating to the weight and the position of the center of gravity is learnt with the aid of a neural network. Applying current operating parameters of the current flight state to the neural network then makes it possible to derive the total weight and the position of the center of gravity, as a learnt value, from the neural network in which the individual operating parameters were related to one another. The disadvantage of this is that the result is only a rough estimation and the accuracy is also highly dependent on the training data for training the neural network.

U.S. Pat. No. 6,275,769 B1 discloses a portable computer having a display for determining the position of the center of gravity, in which a type of sketch of the aircraft interior is shown using the display. Different regions can then be used to set the loading state and other operating parameters which influence the center of gravity for different aircraft regions, from which the position of the center of gravity can then be approximately estimated. The disadvantage here can be seen, in particular, in the fact that flight-dependent operating parameters, for example the amount of fuel, are not sufficiently taken into account, with the result that it is not possible to discern a change in the center of gravity during flight. In addition, this method likewise provides only a rough estimation.

US 2010/0063718 A1 furthermore discloses a method for estimating the position of the center of gravity in aircraft, in which strain values are measured with the aid of strain gages on the chassis of the aircraft when the aircraft parks on the ground. These measured strain values from the individual elements of the overall chassis can then be used to calculate the center of gravity of the aircraft. Although this makes it possible to influence the loading state in advance when loading the aircraft, since it is possible to continuously determine the center of gravity on the ground, a shift of the center of gravity during flight cannot be discerned thereby either.

Therefore, the object of the present invention is to specify an improved system and an improved method which can be used to calculate the actual center of gravity of an aircraft even during flight in a reliable and accurate manner, to be precise independently of the operating parameters which influence the center of gravity.

The object is achieved, according to the invention, with the initially mentioned device for determining the actual center of gravity of a vehicle, having:

a control command input interface for determining control command inputs for controlling the movement of the vehicle, a movement modeling unit which is set up to calculate reference acceleration data at a model reference point of the vehicle with respect to the control command inputs on the basis of modeled movements of the vehicle, which are derived from a vehicle movement model, with respect to the control command inputs determined via the control command input interface, a sensor interface for determining sensor acceleration data which are measured by an acceleration sensor system at a sensor reference point of the vehicle and relate to the actual movements of the vehicle resulting from the control command inputs, and a computation unit which is set up to determine the actual center of gravity of the vehicle on the basis of an assumed center of gravity and the difference between the reference acceleration data and the sensor acceleration data.

The invention therefore proposes that corresponding control command inputs which are used to control the movement of the vehicle are first of all received or tapped off via a control command input interface. A modeled movement of the vehicle can then be virtually derived using a movement model of the vehicle on the basis of the received control command inputs, with the result that the movement of the vehicle with respect to the actual control command inputs can be simulated in a movement modeling unit. This simulated or modeled movement with respect to the control command inputs can then be used to calculate reference acceleration data at a model reference point of the vehicle, for example the assumed theoretical center of gravity of the vehicle. Corresponding reference acceleration data which can be derived from a simulated movement with respect to actual control command inputs can therefore be calculated for a predetermined model reference point of the vehicle.

An acceleration sensor system installed at a sensor reference point of the vehicle can be used to acquire, in a parallel manner, sensor acceleration data which result from an actual movement of the vehicle at the sensor reference point, the actual movement of the vehicle resulting from the control command inputs which have been previously input. In the simplest case, the model reference point, the sensor reference point and the theoretically assumed center of gravity are identical.

Reference acceleration data calculated or modeled with respect to the input control command inputs at the model reference point and actually measured sensor acceleration data at the sensor reference point of the vehicle were therefore determined and are then input to the computation unit in order to determine the actual center of gravity. In this case, the computation unit is set up in such a manner that it can determine the actual center of gravity of the vehicle on the basis of a theoretically assumed center of gravity of the vehicle and a difference between the reference acceleration data and the sensor acceleration data. Assuming that the movement model derives a movement of the vehicle with respect to the control command inputs, which takes into account the theoretical or assumed center of gravity of the vehicle, a difference between the reference acceleration data and the actually measured sensor acceleration data results if the center of gravity is shifted and indicates a shift in the center of gravity. The so-called deviation of the center of gravity, that is to say the shift of the actual center of gravity away from the theoretically assumed center of gravity, can then be determined from the difference and the underlying kinematics of the vehicle.

If there is no deviation of the center of gravity, with the result that the actual center of gravity corresponds to the theoretically assumed center of gravity, the reference acceleration data are substantially identical to the sensor acceleration data if the model reference point corresponds to the sensor reference point. Otherwise, conversion is also possible on the basis of the kinematics.

The reference points are advantageously congruent with the theoretically assumed center of gravity of the vehicle. In this case, the acceleration sensor system for determining the sensor acceleration data is also installed at the theoretically assumed center of gravity of the vehicle. If the center of gravity shifts, the acceleration sensor system is then used to measure acceleration data which differ from the reference acceleration data which depict the ideal situation, the actual center of gravity being able to be calculated using the differences and the kinematics of the vehicle.

However, it is also conceivable for the reference points not to be identical to the theoretically assumed center of gravity, with the result that the difference resulting from the reference acceleration data and the sensor acceleration data has to be calculated back to the assumed theoretical center of gravity using the physical kinematics of the vehicle. The actual center of gravity of the vehicle can also be determined in this manner.

An automatic control command system is advantageously used to generate predefined control command inputs which are particularly well suited to determining the actual center of gravity in the manner of the present invention. Such control command inputs may be, for example, severe pitching or rolling movements of the vehicle. The predetermined control command inputs generated are then used to control the vehicle, the automatically generated control command inputs being able to be received via the control command input interface. The entire process of determining the center of gravity can therefore be automated and standardized.

Alternatively, however, it is also conceivable for corresponding instructions to be predefined to the vehicle driver, for example a pilot, which instructions must be carried out by the driver in the form of control command inputs in order to thus initiate the determination of the actual center of gravity.

The vehicle in the sense of the present invention may be a flying object, for example an aircraft or a helicopter, as a result of which the actual center of gravity can be determined even during flight, also several times, with the aid of the present invention. The advantage of this can be seen, in particular, in the fact that it is possible to determine the actual center of gravity not only in the horizontal plane (XY direction) but also in the vertical plane (Z direction), which is not normally possible with the methods known from the prior art.

The movement model from the movement modeling unit may be a dynamic movement model in which the entire dynamics of the vehicle are simulated using a model. However, the movement model may also be a kinematic movement model in which the movement with respect to the control command inputs is derived from the kinematic relationships of the vehicle. Finally, in one simple form, the movement model may also be a database containing maximum values for the movement for particular control command inputs, the movement then being estimated using the control command inputs and the reference values stored in the database.

The movement model of the vehicle therefore describes the relationship between the control command inputs and the resultant movement of the vehicle, with the result that the movement of the vehicle can be derived from known control command inputs. Acceleration values at different positions in the vehicle can then be derived or calculated from the derived modeled movement of the vehicle, for example taking the kinematics of the vehicle as a basis.

The acceleration sensor system is advantageously set up to acquire rotational and translational sensor acceleration data. The movement modeling unit is advantageously set up to calculate rotational and/or translational reference acceleration data.

The determination of the actual center of gravity can then be used, for example, to correct movement and/or acceleration data from a sensor system, which is installed at the theoretically assumed center of gravity of the vehicle, in order to thus minimize the error components resulting from a deviation of the center of gravity.

The object is also achieved, for the rest, by the initially mentioned method having the following steps:
control command inputs for controlling the movement of the vehicle are determined via a control command input interface, a movement modeling unit calculates reference acceleration data at a model reference point of the vehicle with respect to the control command input on the basis of modeled movements of the vehicle, which are derived from a vehicle movement model, with respect to the control command inputs determined via the control command input interface, sensor acceleration data which are measured by an acceleration sensor system at a sensor reference point of the vehicle and relate to the actual movements of the vehicle resulting from the control command inputs are determined, and a computation unit determines the actual center of gravity on the basis of an assumed center of gravity and the difference between the reference acceleration data and the sensor acceleration data.

Figure 2:
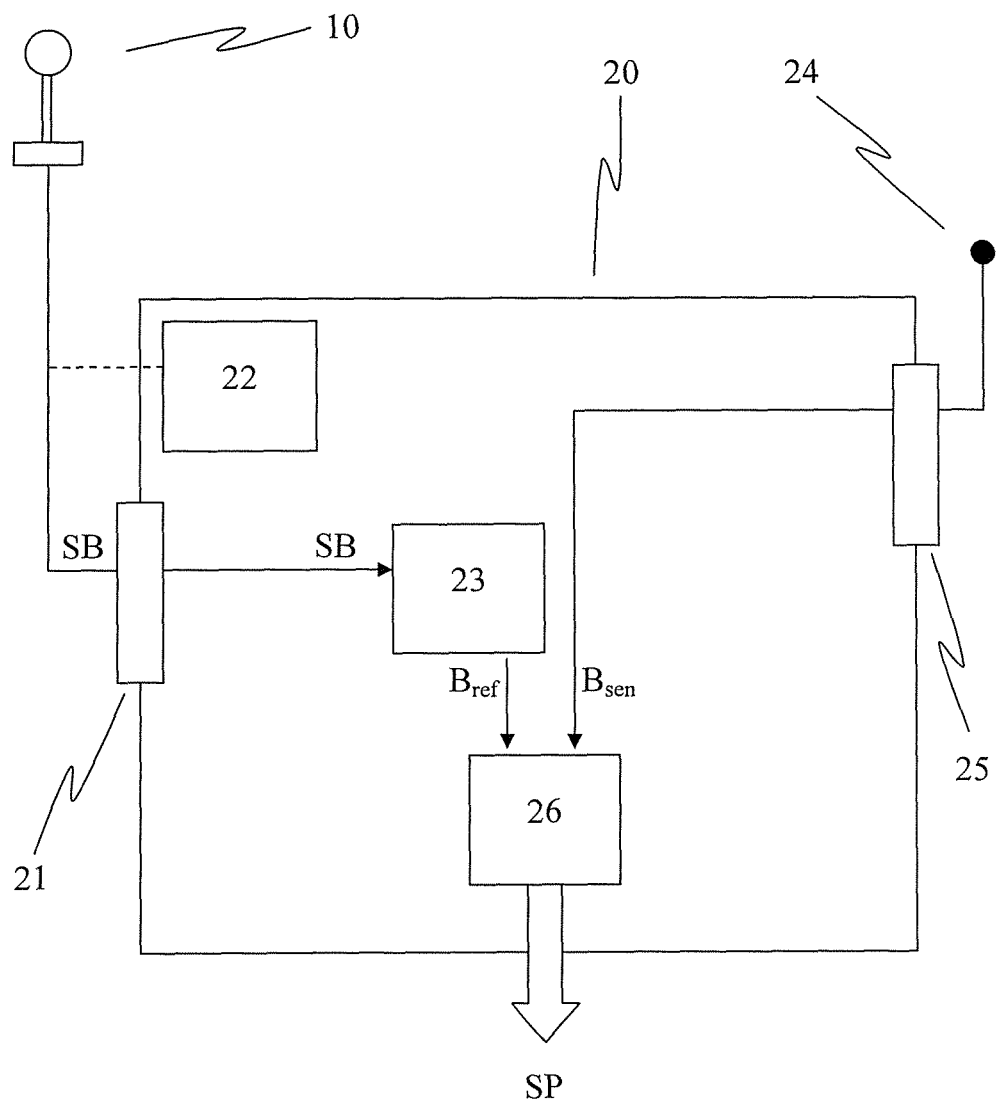
Figure 3:
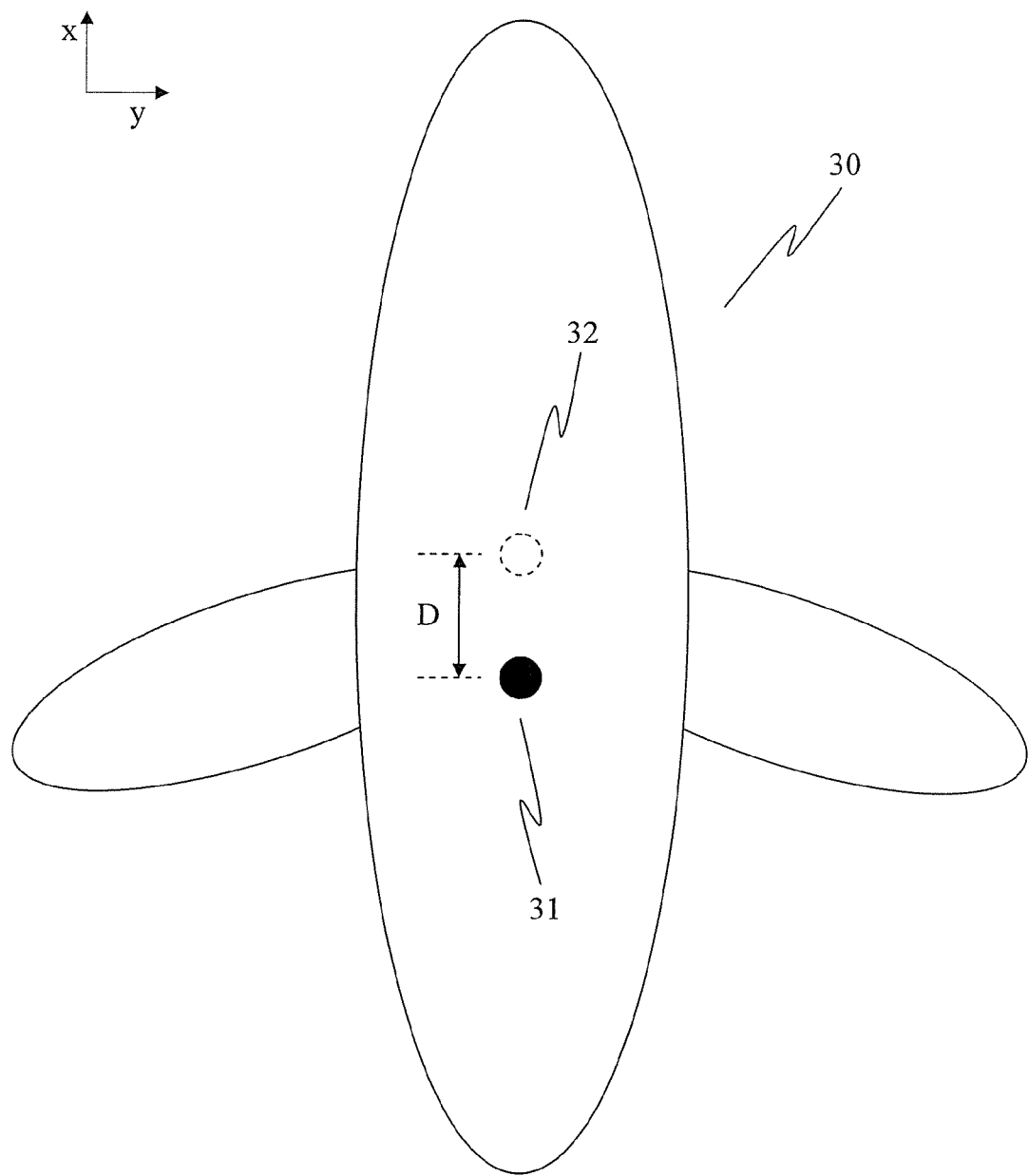

The invention is explained in more detail by way of example using the accompanying drawings, in which:

FIG. 1—shows a flowchart of the present invention;

FIG. 2—shows a schematic illustration of the device according to the invention;

FIG. 3—shows a schematic illustration of a flying object with deviation of the center of gravity.

FIG. 1 shows a flowchart relating to the present invention. The pilot uses a control command input device 10 to input manual control command inputs for controlling the movement of the vehicle. Alternatively, the control command input device 10 may also be an automatic control command system which automatically generates control command inputs for controlling the movement of the vehicle.

If the control command inputs SB of the vehicle are supplied, this results in a movement 11 of the vehicle. This movement 11 of the vehicle is then used to measure the actual acceleration data at a sensor reference point of the vehicle in step 12 by means of an acceleration sensor system installed at this sensor reference point, with the result that actual acceleration data can be determined from the movement 11 of the vehicle. In this exemplary embodiment, the sensor reference point of the vehicle is the theoretically assumed center of gravity of the vehicle.

Parallel to this, the input control command inputs SB are supplied to a movement model which depicts the relationship between control inputs and resultant movements of the vehicle in a dynamic or kinematic manner or by estimation. In step 13, the input control command inputs SB are used to derive a simulated movement of the vehicle from the movement model, from which movement the acceleration data at a model reference point of the vehicle can then be calculated in step 14. In this case, the reference acceleration data reflect the ideal acceleration data which would also be measured if the center of gravity were not changed.

Both the calculated reference acceleration data and the measured sensor acceleration data are now supplied to a computation unit which determines the difference between the two items of acceleration data in step 15. This is because the actually measured sensor acceleration data with respect to the control command inputs SB differ from the reference acceleration data as a result of a change in the position of the center of gravity of the vehicle, which can be ascertained by the difference in step 15. The actual center of gravity of the vehicle can then be determined in step 16 using the difference and the underlying kinematics of the vehicle, to be precise taking the theoretically assumed center of gravity as a basis, which is also the basis for calculating the reference acceleration data.

If the sensor reference point and the model reference point are not congruent, the respective acceleration data can be calculated back to the respective other reference point on the basis of the kinematic relationship.

FIG. 2 schematically shows a block diagram of the device 20 for determining the actual center of gravity of the vehicle, for example a flying object. Control command inputs SB from a control command input device 10 are received via an interface 21 of the device 20. Alternatively, the device 20 may also have an automatic control command system 22 which automatically generates corresponding control command inputs SB which are additionally suitable for determining the actual center of gravity in the manner of the present invention.

The control command inputs received via the interface 21 are then supplied to a movement modeling unit 23 which then simulates or calculates the movements of the vehicle, which result from the control command inputs SB, taking a suitable movement model of the vehicle as a basis. The assumed or simulated movement of the vehicle on the basis of the input control command inputs SB is then used to calculate the acceleration data $B_{Ref}$ occurring at the model reference point, for example the theoretically assumed center of gravity of the vehicle, with the result that reference acceleration data are available.

At the same time, a sensor system 24 installed at the sensor reference point of the vehicle is used to measure the acceleration data $B_{Sen}$ which occur there and are then provided via an interface 25 of the device 20.

Both the reference acceleration data $B_{Ref}$ and the measured sensor acceleration data $B_{Sen}$ are then supplied to a computation unit 26 which forms the difference between both data records and then determines the actual center of gravity of the vehicle on the basis of the theoretically assumed position of the center of gravity and the difference formed. This may be effected, for example, using a characteristic curve in which the deviation of the center of gravity can be ascertained depending on the determined difference between the data. However, it is also conceivable for the actual center of gravity to then be able to be calculated on the basis of the kinematics of the vehicle and the ascertained difference in the data.

The actual center of gravity calculated in this manner can then be made available to other systems of the vehicle, for example, in order to thus correct the movement data acquired by the sensor system 24, for example.

FIG. 3 schematically shows a deviation of the center of gravity in an aircraft 30. The theoretically assumed center of gravity of the aircraft 30 is at the position 31. The position of the theoretically assumed center of gravity 31 can be determined, for example, by calculating an ideal state. However, it is also conceivable for the theoretically assumed center of gravity 31 to be determined on the ground by measuring or weighing the aircraft before flight. The sensor system may also be installed at the theoretically assumed center of gravity 31, with the result that the point 31 can also be the sensor reference point. The model reference point is advantageously also at the point 31. However, the model reference point may also be the actual, unknown center of gravity, in which case conversion as desired is possible.

As a result of changed operating parameters of the aircraft 30 during flight, for example as a result of a reduction in the amount of fuel, the actual center of gravity may shift and may differ from the previously theoretically assumed center of gravity 31. This is indicated in FIG. 3 by the dashed circle 32. The difference D between the assumed center of gravity 31 and the actual center of gravity 32 (only shown here in the horizontal plane in the example in FIG. 3) can be determined from the difference between the reference acceleration data and the actually measured sensor acceleration data, with the result that the actual center of gravity 32 can be inferred from the assumed center of gravity 31.

The rate of rotation ω and the angular accelerations $$\frac{d\omega}{dt}$$

can be used to calculate the new position of the center of gravity from the reference accelerations $a_{ref}$ at the model reference point and the measured sensor accelerations $a_{mess}$ at the sensor reference point with the aid of the following relationship:

$$SP = \begin{pmatrix} X_{SP} \\ Y_{SP} \\ Z_{SP} \end{pmatrix}$$

$$a_{ref} = a_{mess} - \frac{d\omega}{dt} \times SP - \omega \times (\omega \times SP)$$

$a_{ref}$ is known from the movement model. The deviation of the center of gravity is then calculated as follows:

$$J(SP) = a_{ref} - a_{mess} + \frac{d\omega}{dt} \times SP - \omega \times (\omega \times SP) \to 0$$

$$\min_{SP}(J(SP)) \to 0$$

The coordinates of the center of gravity can be unambiguously determined by minimizing the error between $a_{ref}$ and $a_{mess}$ using the center of gravity SP. At the latter, the coordinates of the center of gravity follow from a functional relationship since the above equation can be solved analytically.

A further possibility is also minimization using the speed.

The invention claimed is:

1. Device (20) for determining the actual center of gravity (32) of a vehicle (30), having:
    a control command input interface (21) for determining control command inputs (SB) for controlling the movement of the vehicle (30),
    a movement modeling unit (23) which is set up to calculate reference acceleration data ($B_{Ref}$) at a model reference point (31) of the vehicle with respect to the control command inputs (SB) on the basis of modeled movements of the vehicle (30), which are derived from a vehicle movement model, with respect to the control command inputs (SB) determined via the control command input interface (21),
    a sensor interface (25) for determining sensor acceleration data ($B_{Sen}$) which are measured by an acceleration sensor system (24) at a sensor reference point (31) of the vehicle (30) and relate to the actual movements of the vehicle (30) resulting from the control command inputs (SB), and
    a computation unit (26) which is set up to determine the actual center of gravity (32) of the vehicle (30) on the basis of an assumed center of gravity (31) and the difference between the reference acceleration data ($B_{Ref}$) and the sensor acceleration data ($B_{Sen}$).

2. Device (20) according to claim 1, characterized in that the movement model from the movement modeling unit is a dynamic movement model, a kinematic movement model and/or a database containing reference values for the control command inputs.

3. Device (20) according to claim 1, characterized in that the model reference point and/or the sensor reference point of the vehicle is/are the assumed center of gravity of the vehicle.

4. Device (20) according to claim 1, characterized in that the acceleration sensor system is set up to acquire rotational and/or translational sensor acceleration data ($B_{Sen}$), and/or the movement modeling unit is set up to calculate rotational and/or translational reference acceleration data ($B_{Ref}$).

5. Device (20) according to claim 1, characterized in that an automatic control command system (22) is provided and is set up to generate predefined control command inputs for automatically controlling the movement of the vehicle, the control command input interface (21) being designed to receive the automatically generated control command input.

6. Method for determining an actual center of gravity of a vehicle, having the following steps:
    control command inputs for controlling the movement of the vehicle are determined via a control command input interface,
    a movement modeling unit calculates reference acceleration data at a model reference point of the vehicle with respect to the control command input on the basis of modeled movements of the vehicle, which are derived from a vehicle movement model, with respect to the control command inputs determined via the control command input interface,
    sensor acceleration data which are measured by an acceleration sensor system at a sensor reference point of the vehicle and relate to the actual movements of the vehicle resulting from the control command inputs are determined, and
    a computation unit determines the actual center of gravity on the basis of an assumed center of gravity and the difference between the reference acceleration data and the sensor acceleration data.

7. Method according to claim 6, characterized in that the movement model from the movement modeling unit is a dynamic movement model, a kinematic movement model and/or a database containing reference values relating to the control command inputs.

8. Method according to claim 6, characterized in that the model reference point and/or the sensor reference point of the vehicle is/are the assumed center of gravity of the vehicle.

9. Method according to claim 6, characterized by acquisition of rotational and/or translational sensor acceleration data by the acceleration sensor system and calculation of rotational and/or translational reference acceleration data by the movement modeling unit.

10. Method according to claim 6, characterized by generation of predefined control command inputs for automatically controlling the movement of the vehicle by an automatic control command system and supplying of the automatically generated control command inputs to the control command input interface.

* * * * *